(12) United States Patent
Yoo

(10) Patent No.: US 7,174,549 B2
(45) Date of Patent: Feb. 6, 2007

(54) COMPUTER SYSTEM AND METHOD FOR STORING PRODUCT KEYS THEREOF

(75) Inventor: Chang-Woong Yoo, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 937 days.

(21) Appl. No.: 09/836,333

(22) Filed: Apr. 18, 2001

(65) Prior Publication Data
US 2002/0059570 A1  May 16, 2002

(30) Foreign Application Priority Data
Jul. 27, 2000  (KR) ............... 2000-43479

(51) Int. Cl.
*G06F 9/445* (2006.01)
(52) U.S. Cl. .................................. 717/174
(58) Field of Classification Search ........ 717/168–178; 713/1, 2, 176; 380/28
See application file for complete search history.

(56) References Cited

U.S. PATENT DOCUMENTS

| | | | |
|---|---|---|---|
| 5,519,878 A | 5/1996 | Dolin, Jr. | 709/220 |
| 5,717,930 A | 2/1998 | Imai et al. | 717/176 |
| 5,909,581 A * | 6/1999 | Park | 717/170 |
| 6,075,862 A * | 6/2000 | Yoshida et al. | 380/28 |
| 6,151,707 A * | 11/2000 | Hecksel et al. | 717/178 |
| 6,163,841 A * | 12/2000 | Venkatesan et al. | 713/176 |
| 6,202,070 B1 * | 3/2001 | Nguyen et al. | 707/104.1 |
| 6,567,860 B1 * | 5/2003 | Maxwell et al. | 719/327 |
| 6,681,323 B1 * | 1/2004 | Fontanesi et al. | 713/1 |

FOREIGN PATENT DOCUMENTS

JP  8-87460  4/1996

OTHER PUBLICATIONS

Microsoft Press Computer Dictionary, 1993, Microsoft Press, Second Edition, pp. 37, 73 and 77.*
Installing Windows 98 on an Aptiva 2168 system, 1998, IBM Corp.*
Linas Vepstas, Software-RAID Howto, Nov. 21, 1998.*

* cited by examiner

*Primary Examiner*—Kakali Chaki
*Assistant Examiner*—Trenton J. Roche
(74) *Attorney, Agent, or Firm*—Robert E. Bushnell, Esq.

(57) ABSTRACT

A computer system includes a CPU (central processing unit), a main memory, a BIOS ROM (basic input/output system read only memory), a display device and an input device, and using an OS (operating system) program having its product key. The computer system further includes an OS program storage storing the OS program therein, a product key storage storing the product key of the OS program, a product key storage program reading the product key of the OS program stored in the product key storage to be inputted, when a product key of an OS installation program to reinstall the OS program and the product key stored in the product key storage are identical. With this configuration, where an OS program is to be reinstalled due to damage of a hard disk drive or a critical error of the OS program, the stored product key is read out and is automatically inputted into a product key input window, thereby giving a user convenient computer environment.

27 Claims, 6 Drawing Sheets

COMPUTER SYSTEM AND METHOD FOR STORING PRODUCT KEYS THEREOF

CLAIM OF PRIORITY

This application makes reference to, incorporates the same herein, and claims all benefits accruing under 35 U.S.C. §119 from an application for COMPUTER SYSTEM AND METHOD FOR SAVING OF PRODUCT KEY OF THE SAME earlier filed in the Korean Industrial Property Office on 27 Jul. 2000 and there duly assigned Ser. No. 43479/2000.

BACKGROUND OF THE INVENTION

1. Field of Invention

The present invention relates to a computer system equipped with an operating system program, and more particularly, to a computer system and a technique for facilitating an installation of programs within the computer system.

2. Description of the Background Art

Recently, computer systems have used operating system (OS) programs having multiple functions and a variety of application programs. To provide end users with convenience in using the computer systems, computer manufacturers have launched computer systems installed with some OS programs in hard disk drives thereof, in the markets. For example, the OS programs include WINDOWS 95, WINDOWS 98, WINDOWS 2000 or WINDOWS NT, etc. from the Microsoft Corporation, etc.

If an electric power is supplied to the computer system by the user, some information of the OS program therein is internally configured in the computer system. Accordingly, the user does not need to install a separate OS program in the computer system at the initial operation stage, to use the computer system. The user is only requested to set up the OS program initially installed in the computer system by its manufacturer, adaptive to the user's computer environment, when the computer system is activated by the power supply.

For example, where WINDOWS 98 OS program is installed on the computer system, if power is supplied to the computer system, components and elements thereof are initiated and a Power-On Self-Test (POST) routine is then conducted. After the computer system is booted up according to the OS program, the OS program is subsequently installed. The user sets up the keyboard configuration according to the language with which he or she intends to use, and inputs his or her name or the company name or both his or her name and the company name through the keyboard.

Then, the computer system displays the Certificate of Authenticity on the screen, in order to certify an authenticity of the product of WINDOWS 98 OS program. The computer system asks the user whether or not to agree to a license of the OS program, and if agreed, directs the user to input the product key of the OS program provided together with the OS program. If the right product key for the installed OS program is inputted, installation of the OS program is continued. If the right product key for the installed OS program is not inputted, installation of the OS program terminates. If these processes are completed, the computer system is rebooted. Then, the user sets up a driver for his or her printer. Once the printer driver is set up, the installation of the OS program is completed.

However, the product key of the WINDOWS 98 OS program includes 25 letters, having a complex structure, for which the user is requested to ascertain whether each letter has been correctly inputted, thereby giving the user an inconvenience. In addition, where the Certificate of Authenticity providing the product key is lost, the WINDOWS 98 OS program cannot be installed again.

To solve these problems, some OS programs such as WINDOWS 95 and WINDOWS 98 have their product keys stored in their respective specific areas of the hard disk drives (for example, they are registered in the registry of the system file).

Where the product key is stored in the hard disk drive, the hard disk drive may be damaged due to an attack of a virus program or a mechanical malfunction. Under the circumstances, if the OS program is to be reinstalled, the user has to manually input the product key. In addition, if a new hard disk drive is additionally mounted on the computer system, the user has to directly input the product key for installation of the OS program as in the initial operation stage.

The OS program and application programs need to be reinstalled where the computer system often malfunctions due to mechanical faults of the hard disk drive, an attack of virus programs, critical errors of the OS program in the course of using the computer system, and a user's error, etc. To facilitate the re-installation, the manufacturers have supplied the purchasers a CD-ROM (compact disc read-only memory) for restoration. This CD-ROM includes a program to restore the computer system.

If the above-described problems occur, the user can restore the OS program and the application programs to the initial state of the system by means of the restoration program stored in the CD-ROM.

Even when installing the OS program by means of the restoration CD-ROM, the above-described processes should be carried out to reinstall the OS program on the computer system, and therefore, the user has to directly input the product key of the OS program, inconveniencing the user. If the Certificate of Authenticity having the product key is lost, the user has still a difficulty in reinstalling the OS program.

Exemplars of the art are U.S. Pat. No. 5,519,878 issued to Dolin, Jr. for System for Installing and Configuring (Grouping and Node Address Assignment) Household Devices in an Automated Environment, U.S. Pat. No. 5,717,930 issued to Imai, et al. for Installation System, Japan Patent 8087460 issued to Imai, et al. for Installation System, Korean Patent 1999-48136 issued to Lee et. al., for Computer System having a Function Storing Identification Number and a Method Thereof, and Japan Patent 9305381 issued to Kondo for Installation Device for Software, Installation System for Software and Installation Method for Software.

SUMMARY OF THE INVENTION

It is therefore an object of the present invention to provide a computer system allowing the product key to certify the authenticity of the product to be automatically inputted when the OS program is reinstalled, thereby making it easier to reinstall the OS program, and a method therefor.

Another object of the present invention is to provide a computer system allowing the product key of the OS system to be inputted through a bar code reader and a method therefor.

Still another object of the present invention is to provide a computer system storing therein information for product authenticity, where the stored information for product authenticity is read out and automatically inputted into a product key input window, when the OS program is reinstalled.

These and other objects of the present invention may be achieved by a provision of a computer system having a CPU (Central Processing Unit), a main memory, a BIOS ROM (basic input/output system read only memory), a display device and an input device, and using an OS program having its product key. The present invention further includes an OS program storage storing the OS program therein, a product key storage storing the product key of the OS program, a product key storage program reading the product key of the OS program stored in the product key storage to be inputted, when a product key of an OS installation program to reinstall the OS program and the product key stored in the product key storage are identical. Information on the product key of the OS installation program can be a bar code-readable signal. The OS installation program is provided with an information input window to allow a user to directly input the product key thereinto, when the product key of the OS installation program and the product key stored in the product key storage are not identical with each other. The product key storage can be accommodated in an extended CMOS RAM (complementary metal-oxide semiconductor random-access memory). The product key storage program can be installed in a hard disk drive storing the OS program and application programs therein.

According to another aspect of the present invention, a method is provided for storing a product key of an OS program in a computer system having a CPU, a main memory, a BIOS ROM, an auxiliary memory storing therein information set up by the BIOS ROM, using the OS program having the product key thereof, including the steps of reading the product key having a bar code by a bar code reader, corresponding to an installation process of the OS program, and storing the product key in a product key storage by activating a product key storage program. The product key storage can be accommodated in an extended CMOS RAM. The product key storage program can be installed in a hard disk drive storing the OS program and application programs therein.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
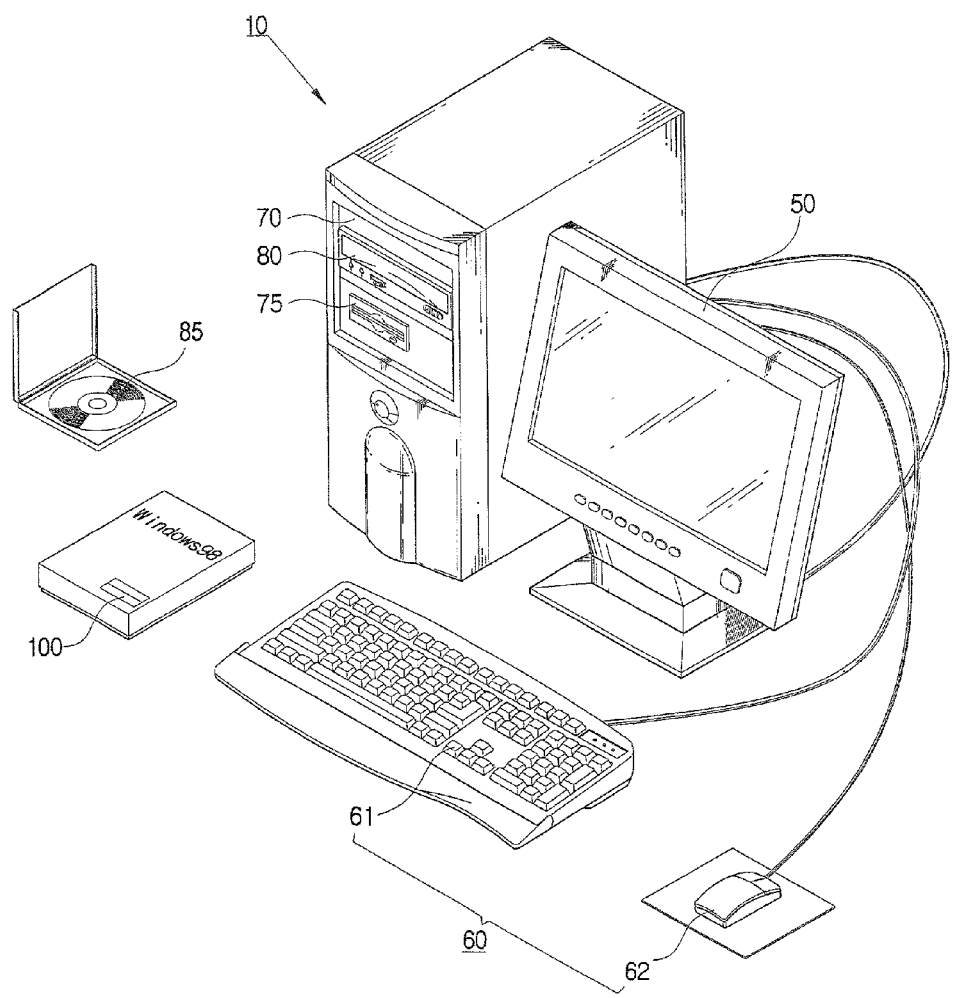
FIG. 1 is a perspective view schematically showing a computer system having a WINDOWS-type OS program according to the present invention.
Figure 2:
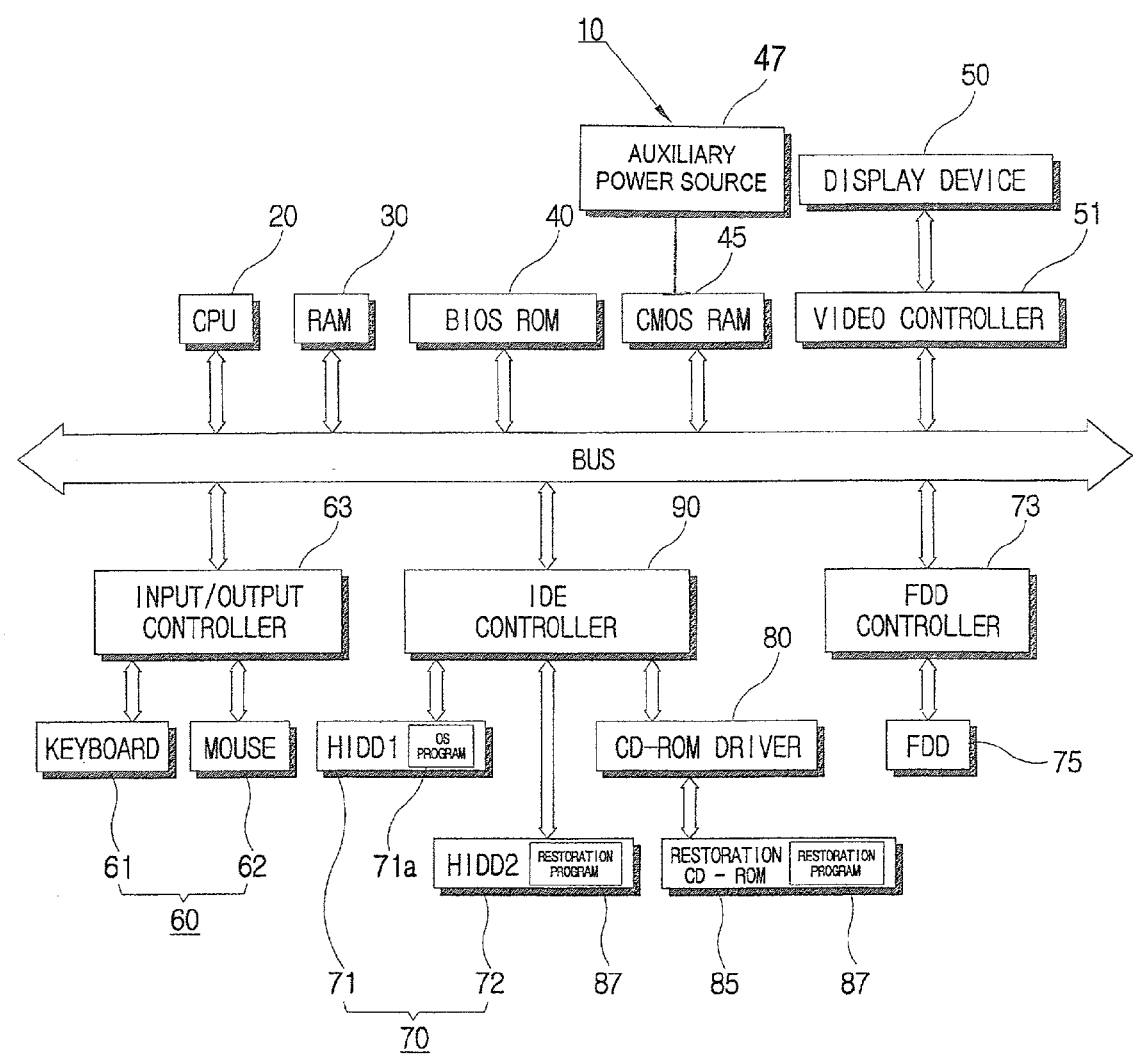
FIG. 2 is a block diagram showing a configuration of the computer system of FIG. 1.

Turning now to the drawings, referring to FIGS. 1 and 2, a computer system according to the present invention includes a main body 10, an input device 60 for inputting an external signal, and a display device 50 receiving from the main body 10 the input signal inputted through the input device 60 and displaying it out.

The main body 10 is provided with a floppy disk drive 75, a CD-ROM drive 80 and a hard disk drive 70. Within the main body 10 are installed a main board (not shown) on which a CPU 20 and a RAM (random access memory) 30 are installed, and a number of hardware units (not shown).

The main board installed within the main body 10 includes a CPU 20, the RAM 30, a BIOS ROM 40 storing a BIOS therein, an extended CMOS RAM 45 storing the product key therein, and a video controller 51 transferring graphic data to the display device 50. The main board further includes an input/output controller 63 controlling the input device 60 having a keyboard 61 and a mouse 62, an integrated drive electronics (IDE) controller 90 which is a standard interface between a data bus and a disk device, and a FDD (floppy disk drive) controller 73 controlling the floppy disk drive 75.

The BIOS stored in the BIOS ROM 40 reads out or modifies the information stored in the CMOS RAM 45, so as to control the CD-ROM drive 80 for restoration or the hard disk drive 70 to be described later. A CMOS RAM 45 is a low power random access memory that is used to store for example configuration data for the computer and is usually powered by a battery 47 when the computer is turned off.

The extended CMOS RAM 45 preserves the stored information therein, by means of power supplied thereto from an auxiliary power supply 47 (e.g., battery). The extended CMOS RAM 45 also compresses and transforms the product key inputted from a bar code reader 130 so as to be stored therein, under the control of a product key storage program 140 to be described later. The extended CMOS RAM 45 includes input/output address ports (not shown) of standard CMOS RAM for IBM (International Business Machines) personal computer and additional input/output address ports (not shown) together.

One of the input/output address ports is a region for storing offset data to be written and read from 128 data of the extended CMOS RAM. The data for the offset position written onto this port is written and read through one of the additional input/output address ports.

The product key is written onto a specific region of the extended CMOS RAM 45 under the control of the product key storage program 140, and it is read out from the specific region of the RAM under a restoration program 87.

The CD-ROM drive 80 includes a boot device, and a CD-ROM 85 for restoring the computer system, to be driven in the CD-ROM drive 80. The CD-ROM includes a restoration program 87 for restoring the computer system. The restoration program 87 allows an OS program 71a and application programs to be installed as in the initial state of purchasing the computer system, when the OS program and the application programs stored in the hard disk drive 70 are damaged.

The hard disk drive 70 includes a primary hard disk drive 71 as a boot device storing the OS program 71a therein, and a secondary hard disk drive 72 storing the restoration program 87 therein. The primary hard disk drive 71 stores a WINDOWS 98 OS program 71a and application programs therein. The secondary hard disk drive 72 copies the restoration program 87 from the restoration CD-ROM 85 and stores it therein, and restores the OS program 71a and the application programs to the initial installation state by the stored restoration program 87. Within the hard disk drive 70 is stored the product key storage program 140 (see FIG. 3).

Figure 3:
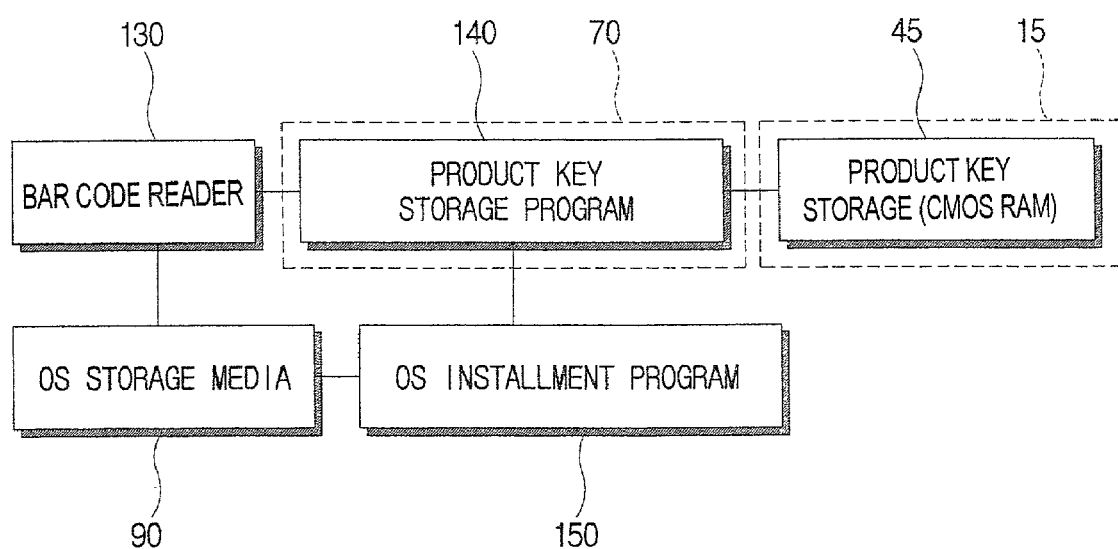
FIG. 3 is a block diagram showing a product key storage system, reading the product key of the OS program.
Figure 4:
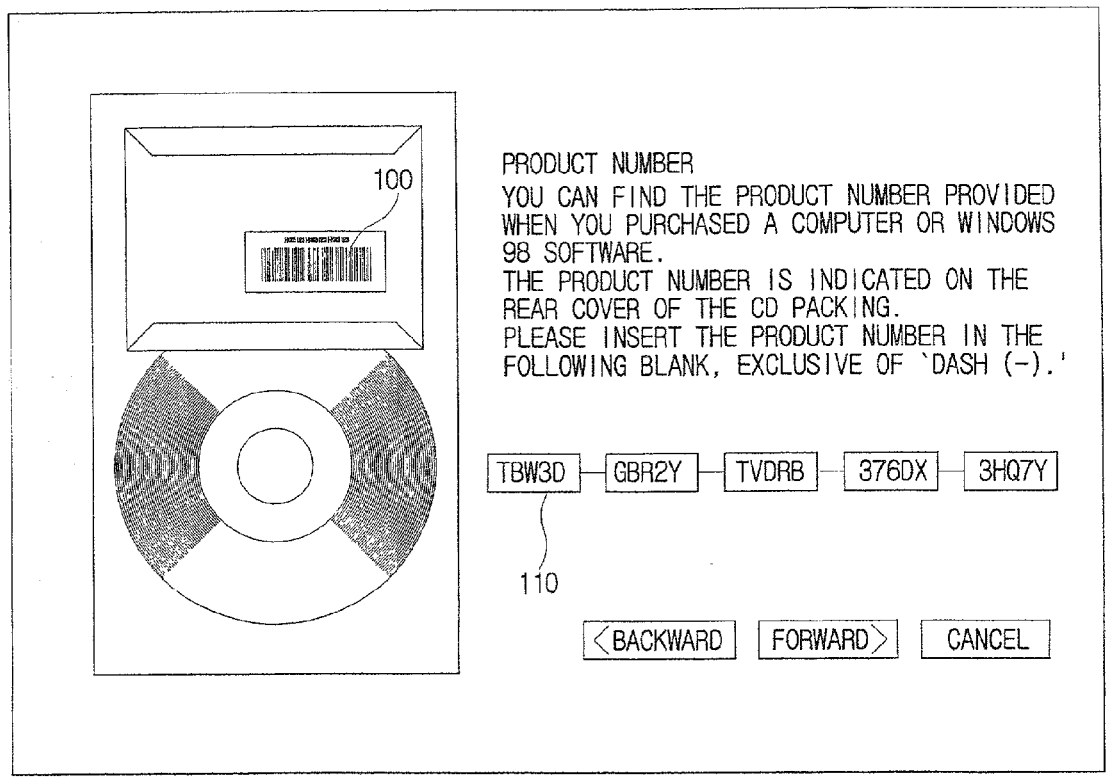
FIG. 4 is a view showing a window display for inputting the product key, displayed at the installation stage of the WINDOWS-type OS program.

Hereinafter, the present invention will be described in detail with reference to FIGS. 2 and 3. As shown, the product key storage program 140 according to the present invention receives the product key information inputted from the bar code reader 130 when the OS program 71a is initially installed, and writes it onto a specific memory device (e.g., the CMOS RAM 45). When the OS program 71a is reinstalled in the hard disk drive 71, the restoration program 87 automatically writes the product key written on the memory device onto a product key input display 110.

Figure 5:
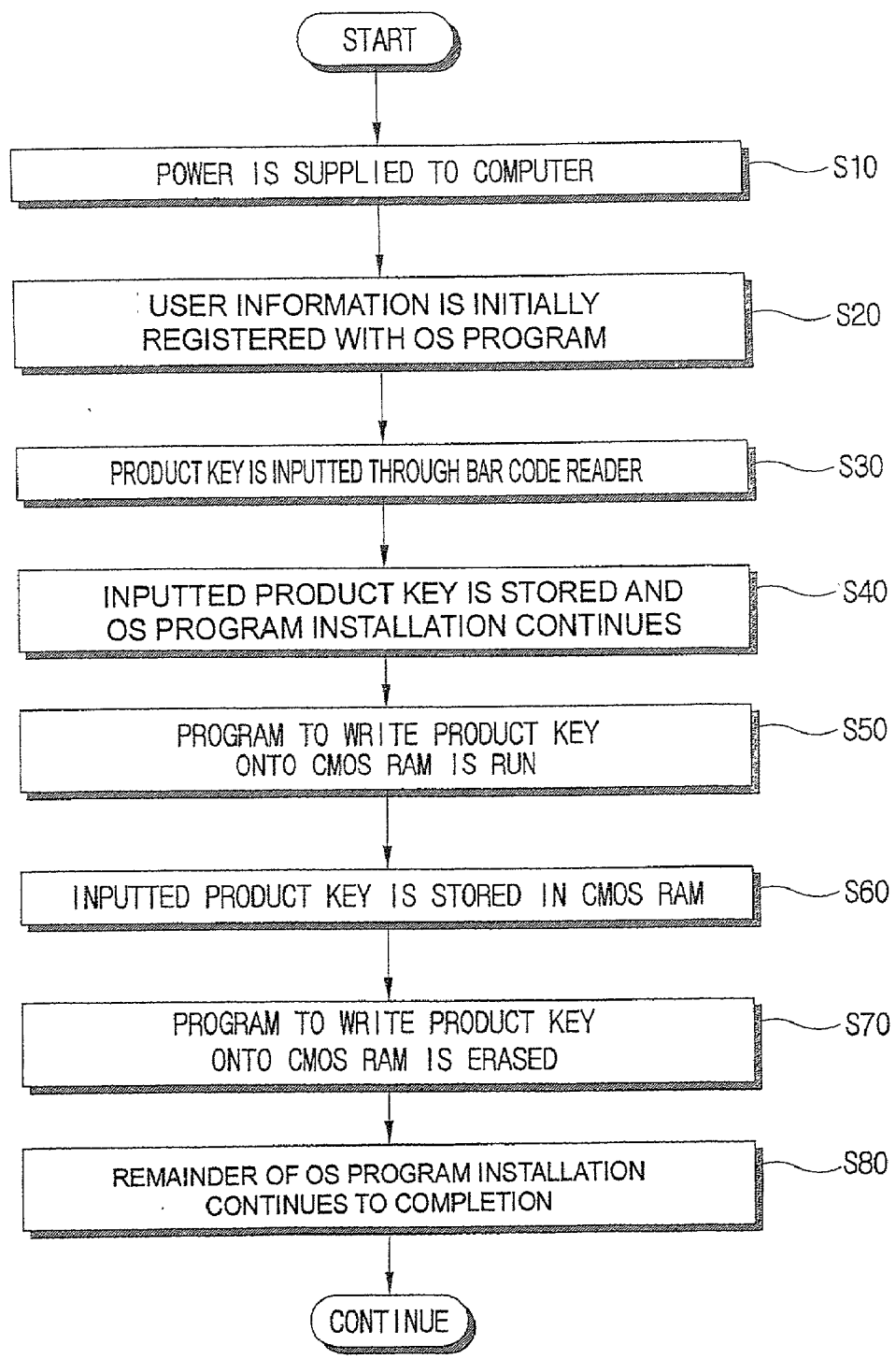
FIG. 5 is a flow chart to store the product key at the installation stage of the initial OS program of the computer system according to the present invention.

Referring to FIG. 5, the computer system is provided with the OS program installed by its manufacturer. The OS program 71a is initially executed when the computer system first runs, by allowing the CPU 20 to execute the product key storage program 140 pre-stored in the hard disk drive 70.

If power is first supplied to the computer system (step S10), a user information is initially registered according to the installation process of the OS program 71a (S20). The product key is inputted through the bar code reader 130 from a bar code 100 of an OS storage media 90, to certify the product authenticity of an OS installation program 150 (S30). The inputted product key is stored in a specific region of the hard disk drive 70, and the OS program 71a installation continues according to the installation process of the OS installation program 150 (S40). Subsequently, the product key storage program 140 to write the product key onto the extended CMOS RAM 45 is activated (S50). The product key inputted through the bar code reader 130 by the product key storage program 140 is written onto the extended CMOS RAM 45 (S60). If the product key is stored in the extended CMOS RAM 45, the product key storage program 140 is then erased to prevent the product key of the OS program from being reentered (S70). Next, the remainders of the OS program 71a continues to install until conclusion according to the OS program installation process (S80).

Figure 6:
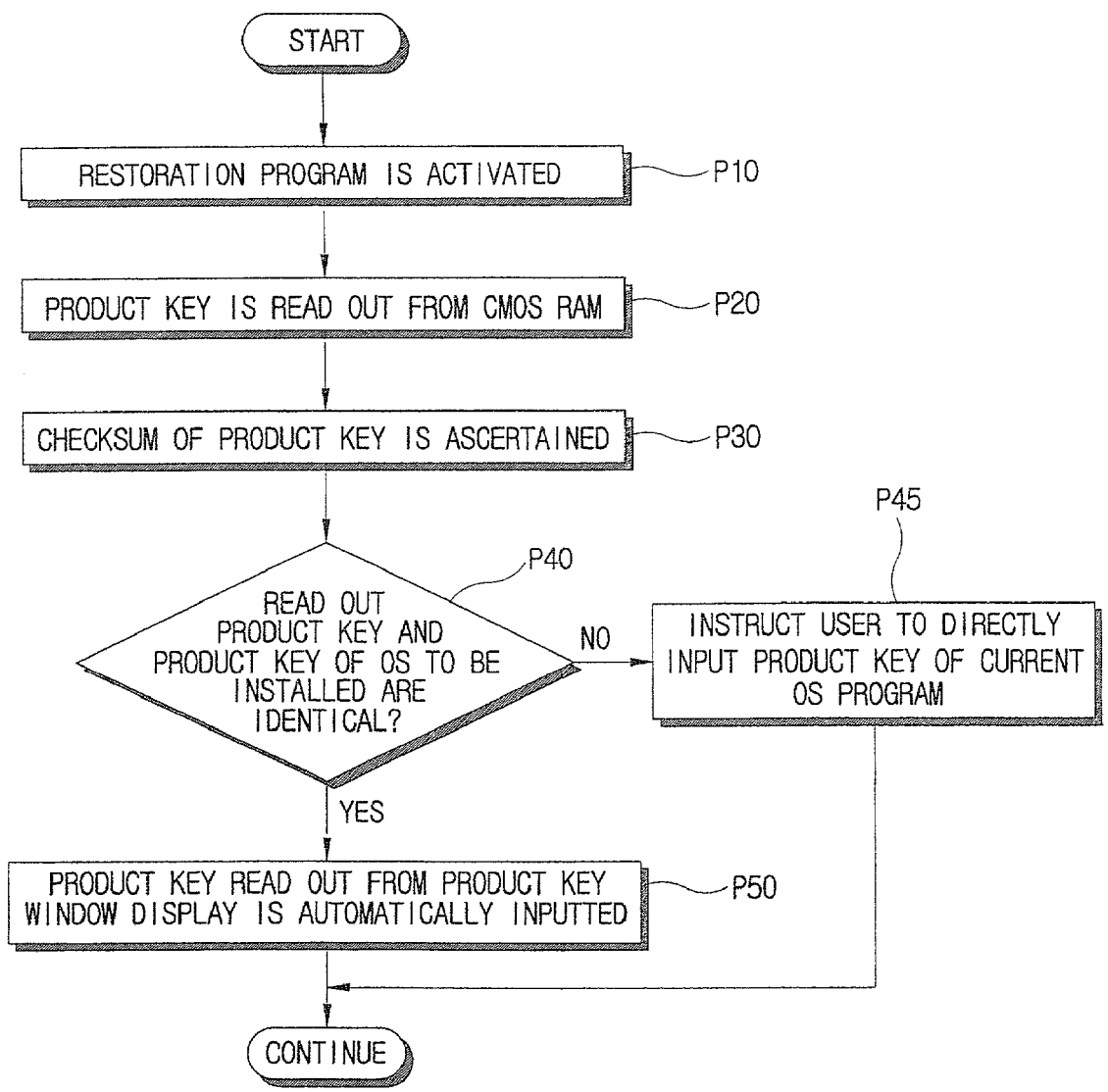
FIG. 6 is a flow chart to automatically input the product key by means of the restoration program at the installation stage of the initial OS program of the computer system according to the present invention.

Referring to FIG. 6, the OS program 71a and the application programs are restored to the initial installation stage by the restoration program 87 stored in the restoration CD-ROM 85 or the OS program 71a is reinstalled by copying the restoration program onto a new hard disk drive (e.g., the secondary hard disk drive 72).

In more detail, if the restoration program 87 is activated (step P10), the product key of the OS program 71a is read out from the extended CMOS RAM 45 (P20). If the product key is read out, a checksum of the specific regions of the extended CMOS RAM 45 is ascertained as to whether the read product key has the right information (P30). A checksum procedure is a technique for determining whether a data stream contains any errors.

Then, the read product key from the CMOS RAM 45 and the product key of the OS program 71a to be reinstalled, taken from the restoration program 87, are compared to ascertain whether they are identical (P40). As a result of comparison, if the two product keys are identical, the read product key is inputted into the product key input window 110 to certify the product authenticity (P50). The program is on standby until a certification button is activated for the next process of the OS program 71a.

Where it is determined in the step of P40 that the two product keys are not identical, a message to advise the user that the OS program 71a to be reinstalled is not identical to the previous version of the OS program is displayed along with the product key input window 110, so as to allow the user to directly input the product key of the current OS program (P45).

According to the above embodiments, it has been described that the product key storage program is stored within the hard disk drive. However, if there is provided a storable and erasable flash memory, the product key storage program can be stored in the flash memory.

If the product key of the OS program is read out by the bar code reader and stored in a storage device, the product key can be automatically inputted in the next installation processes by means of the restoration program.

As described above, if a restoration program and a product key input program are provided, the product key to certify the product authenticity is automatically inputted when an OS program is to be reinstalled due to damage of an existing hard disk drive or an installation of a new hard disk drive, thereby giving the user a convenient computer environment. Additionally, because the product key of the installed OS program is stored in the CMOS RAM, the OS program can be reinstalled although the certificate of authenticity having the product key is lost.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A computer system, comprising:
    a first data storage unit storing a first program and a second program;
    a second data storage unit storing a product key of the first program according to the second program, the product key accommodating an installation of the first program, said second data storage unit being separate from said first data storage unit; and
    a third program stored in the first data storage unit for reinstalling the first program, the third program reading the product key of the first program stored in the second data storage unit, when a product key from the third program and the product key stored in the second data storage unit are identical,
    with the third program being provided with an information input window to allow a user to directly input the product key, when a product key from the third program and the product key stored in the second data storage unit being not identical with each other.

2. The computer system according to claim 1, with the first program being an operating system controlling the operation of the computer system.

3. The computer system according to claim 1, with the first data storage unit comprising:
    a first unit storing the first program; and
    a second unit storing the third program.

4. The computer system according to claim 3, with the second program being stored in the first unit or the second unit.

5. The computer system according to claim 3, with the second unit being a re-writable magnetic disk storage device or an optical storage device.

6. The computer system according to claim 1, with information on the product key of the first program being a bar code-readable signal.

7. The computer system according to claim 1, further comprising an extended complementary metal-oxide semiconductor random-access memory, the second data storage unit being accommodated in the extended complementary metal-oxide semiconductor random-access memory.

8. The computer system according to claim 7, with the extended complementary metal-oxide semiconductor random-access memory having an auxiliary power source to preserve the stored information when the computer system is off.

9. The computer system according to claim 1, with the second program being installed in a hard disk drive storing the first program and application programs.

10. The computer system according to claim 1, with the second program being erased when the product key is stored in the second data storage unit to prevent the product key of the first program from being reentered.

11. A method for storing a product key of an operating system program, comprising the steps of:
 initiating an initial install of a first program on a first data storage unit on a computer system;
 reading the product key comprised of a bar code by a bar code reader, corresponding to an installation process of the operating system program being a first program, the operating system program for controlling the operations of the computer system, the computer system comprising a central processing unit, a main memory, a basic input-output system read only memory, an auxiliary memory storing therein information set up by the basic input-output system read only memory, using the operating system program having the product key;
 storing the product key in a product key storage by activating a product key storage program;
 installing the remainder of the first program after storing the product key;
 initiating a reinstallation of the first program on the computer system;
 reading the product key from the second data storage unit;
 comparing the product key read from the product key storage with the product key of the first program;
 inputting the product key into a product key input window of the first program when the product keys are compared to be identical; and
 continuing to complete the reinstallation of the first program after the product key is inputted into the product key input window,
 with the step of comparing having the product key of the first program obtained from a third program accommodating the reinstallation of the first program,
 with the third program being provided with the information input window to allow a user to directly input the product key, when the product key from the third program and the product key stored in the second data storage unit being not identical with each other.

12. The method according to claim 11, with the product key storage being accommodated in an extended complementary metal-oxide semiconductor random-access memory.

13. The method according to claim 11, with the product key storage program being installed in a hard disk drive storing the operating system program and application programs therein.

14. A method, comprising the steps of:
 initiating an initial install of a first program on a first data storage unit on a computer system;
 inputting a product key of the first program, the product key being used for certifying an authenticity of the first program and accommodating an installation of the first program on the computer system;
 writing the product key onto a second data storage unit of the computer system;
 installing the remainder of the first program after writing the product key;
 initiating a reinstallation of the first program on the computer system;
 reading the product key from the second data storage unit;
 comparing the product key read from the second data storage unit with the product key of the first program;
 inputting the product key into a product key input window of the first program when the product keys are compared to be identical; and
 continuing to complete the reinstallation of the first program after the product key is inputted into the product key input window.

15. The method according to claim 14, with the step of inputting the product key being through a bar code reader from an installation media of the first program.

16. The method according to claim 14, with the step of storing the product key in the second data storage unit being controlled by a second program, the second program being erased after the step of storing the product key to prevent the product key of the first program from being reentered.

17. The method according to claim 14, further comprising the step of initiating a checksum of the specific regions of the second data storage unit having the product key to ascertain whether the read product key is correct.

18. The method according to claim 14, with the step of comparing having the product key of the first program obtained from a third program accommodating the reinstallation of the first program.

19. The method according to claim 14, further comprising the step of storing the product key in a specific region of the first data storage unit and the first program continuing to install on the computer system before the step of writing the product key onto a second data storage unit, the product key being written from the product key stored on the first data storage unit.

20. The method according to claim 14, with the first program being an operating system controlling the operation of the computer system.

21. The method according to claim 14, with the step of storing the product key. in the first data storage unit being controlled by a second program, the second program being erased after the step of storing the product key to prevent the product key of the first program from being reentered, the step of comparing having the product key of the first program obtained from a third program accommodating the reinstallation of the first program.

22. The method according to claim 21, with the first data storage unit comprising:
 a first unit storing the first program; and
 a second unit storing the third program.

23. The method according to claim 22, with the second program being in stored in the first unit or the second unit.

24. The method according to claim 22, with the second unit being a re-writable magnetic disk storage device or an optical storage device.

25. The method according to claim 22, with the second program being installed in a hard disk drive storing the first program and application programs.

26. The method according to claim 22, with the third program being provided with the information input window to allow a user to directly input the product key, when the product key from the third program and the product key stored in the second data storage unit being not identical with each other.

27. The method according to claim 14, with the second data storage unit being accommodated in the extended complementary metal-oxide semiconductor random-access memory having a backup power source.

\* \* \* \* \*